US00RE50637E

(19) United States
(12) Reissued Patent
Majumder et al.

(10) Patent Number: US RE50,637 E
(45) Date of Reissued Patent: Oct. 14, 2025

(54) AUGMENTED REALITY USING PROJECTOR-CAMERA ENABLED DEVICES

(71) Applicant: The Regents of the University of California, Oakland, CA (US)

(72) Inventors: Aditi Majumder, Irvine, CA (US); Behzad Sajadi, New York, NY (US)

(73) Assignee: THE REGENTS OF THE UNIVERSITY OF CALIFORNIA, Oakland, CA (US)

(21) Appl. No.: 15/630,550

(22) Filed: Jun. 22, 2017

Related U.S. Patent Documents

Reissue of:
(64) Patent No.: 9,064,312
Issued: Jun. 23, 2015
Appl. No.: 13/625,657
Filed: Sep. 24, 2012

U.S. Applications:
(60) Provisional application No. 61/538,414, filed on Sep. 23, 2011.

(51) Int. Cl.

| | |
|---|---|
| ***G09G 5/00*** | (2006.01) |
| ***G06T 3/00*** | (2024.01) |
| ***G06T 3/14*** | (2024.01) |
| ***G06T 7/00*** | (2017.01) |
| ***G06T 7/521*** | (2017.01) |

(Continued)

(52) U.S. Cl.
CPC ..... *G06T 3/14* (2024.01); *G06T 7/521* (2017.01); *G09F 19/226* (2013.01); *H04N 9/3147* (2013.01); *H04N 9/3185* (2013.01); *H04N 9/3194* (2013.01); *G06T 2207/10028* (2013.01)

(58) Field of Classification Search
CPC ..... G06T 3/0068; G06T 7/521; G06T 2207/10028; G09F 19/226; H04N 9/3194; H04N 9/3147; H04N 9/3185
See application file for complete search history.

(56) References Cited

U.S. PATENT DOCUMENTS 6,040,876 A 3/2000 Pettitt et al.
6,505,148 B1 * 1/2003 Mack ..... G06T 17/20 703/7

(Continued)

OTHER PUBLICATIONS

Yang, et al., "Automatic and Continuous Projector Display Surface Calibration Using Every-Day Imagery", The Office of the Future Project, Henry Fuchs, PI, Department of Computer Science, CB#3175, University of North Carolina at Chapel Hill.

(Continued)

*Primary Examiner* — Adam L Basehoar
(74) *Attorney, Agent, or Firm* — NGUYEN TARBET IP LAW

(57) ABSTRACT

An augmented reality scene may be registered onto an arbitrary surface. A camera may capture an image of the arbitrary surface. The camera may analyze the surface geometry of the arbitrary surface. In some embodiments, a processing computing device may analyze data captured by the camera and an adjacent camera to reconstruct the surface geometry of the arbitrary surface. A scene may be registered to a three dimensional coordinate system corresponding to the arbitrary surface. A projector may project the scene onto the arbitrary surface according to the registration so that the scene may not display as being distorted.

53 Claims, 5 Drawing Sheets

(51) Int. Cl.
*G09F 19/22* (2006.01)
*H04N 9/31* (2006.01)

(56) References Cited

U.S. PATENT DOCUMENTS 6,510,244 B2 * 1/2003 Proesmans ..... G01B 11/2513 345/419
6,709,116 B1 * 3/2004 Raskar ..... G01B 11/25 348/E5.137
6,733,138 B2 * 5/2004 Raskar ..... H04N 9/12 345/32
6,734,957 B2 5/2004 Schmidt et al.
6,760,075 B2 7/2004 Mayer, III et al.
6,953,250 B2 10/2005 Yasumi et al.
7,204,595 B2 4/2007 Tamura
7,226,173 B2 6/2007 Aoyanagi
7,314,283 B2 1/2008 Tsukada
7,339,596 B2 3/2008 Tajima
7,581,841 B2 9/2009 Tamura
7,740,361 B2 6/2010 Jaynes et al.
7,763,836 B2 7/2010 Webb et al.
7,773,827 B2 8/2010 Jaynes et al.
7,866,832 B2 1/2011 Jaynes et al.
7,893,393 B2 2/2011 Webb et al.
7,942,530 B2 5/2011 Majumder et al.
8,059,916 B2 11/2011 Jaynes et al.
8,358,873 B2 1/2013 Jaynes et al.
8,379,066 B2 2/2013 Goerzen
8,487,833 B2 7/2013 Jaynes
8,490,002 B2 7/2013 Fai
8,508,671 B2 8/2013 Slack et al.
8,606,004 B2 12/2013 Jaynes et al.
8,730,130 B1 * 5/2014 Pray ..... G03B 37/04 345/8
8,777,418 B2 7/2014 Wright et al.
8,786,788 B2 7/2014 Jaynes et al.
8,817,044 B2 8/2014 Swart
8,817,111 B2 8/2014 Miaw et al.
8,872,799 B2 10/2014 Majumder
8,902,128 B2 12/2014 Wood et al.
8,922,486 B2 12/2014 Harland et al.
8,994,757 B2 3/2015 Surati et al.
9,047,039 B2 6/2015 Perkins et al.
9,049,369 B2 6/2015 Vieth et al.
9,052,584 B2 6/2015 Majumder et al.
9,059,337 B1 6/2015 Robinson et al.
9,064,312 B2 6/2015 Majumder et al.
9,066,088 B1 6/2015 Webb et al.
9,183,771 B2 11/2015 Majumder et al.
9,195,121 B2 11/2015 Sajadi et al.
9,215,455 B2 12/2015 Miaw et al.
9,218,061 B2 12/2015 Majumder et al.
9,319,719 B2 4/2016 Krug
2004/0058729 A1 * 3/2004 Shin-Pin ..... 463/25
2004/0141156 A1 * 7/2004 Beardsley ..... H04N 9/3185 353/69
2004/0145709 A1 * 7/2004 Colucci ..... G03B 37/00 353/94
2004/0184010 A1 * 9/2004 Raskar ..... G03B 37/04 353/94
2004/0239885 A1 * 12/2004 Jaynes ..... H04N 9/3147 353/30
2004/0257540 A1 * 12/2004 Roy ..... H04N 5/74 353/69
2005/0078203 A1 * 4/2005 Akutsu ..... H04N 5/74 348/240.99
2005/0254726 A1 * 11/2005 Fuchs ..... H04N 5/74 382/285
2006/0192925 A1 * 8/2006 Chang ..... G03B 21/14 353/94
2007/0052934 A1 * 3/2007 Widdowson ..... H04N 9/3147 353/94
2007/0195285 A1 * 8/2007 Jaynes ..... G03B 37/04 353/69
2007/0291184 A1 * 12/2007 Harville ..... G06T 3/005 348/745
2008/0095468 A1 * 4/2008 Klemmer ..... H04N 9/3194 382/285
2008/0100805 A1 * 5/2008 Majumder ..... G03B 21/26 353/30
2008/0285843 A1 * 11/2008 Lim ..... G06K 9/2036 382/154
2011/0007172 A1 * 1/2011 Miceli ..... H04N 9/3147 348/222.1
2011/0176007 A1 * 7/2011 Ding ..... H04N 9/3182 348/189
2012/0098937 A1 * 4/2012 Sajadi ..... H04N 9/3197 348/46
2017/0070711 A1 * 3/2017 Grundhofer ..... H04N 9/3182
2017/0118451 A1 * 4/2017 Sakai ..... H04N 9/3147
2017/0295349 A1 * 10/2017 Kasuga ..... H04N 9/3147
2019/0121224 A1 * 4/2019 Edwards ..... H04N 9/3194

OTHER PUBLICATIONS

Stone, Maureen, "Color Balancing Experimental Projection Displays", 9th IS&T/SID Color Imaging Conference, Apr. 1, 2001.
Raskar, Ramesh et al., "iLamps: Geometrically Aware and Self-Configuring Projectors", ACM Siggraph 2003 Conference Proceedings.
Raij, Andrew et al., "PixelFlex2: A Comprehensive, Automatic, Casually-Aligned Multi-Projector Display", Department of Computer Science, University of North Carolina at Chapel Hill.
Ramesh, et al., "The Office of the Future: A Unified Approach to Image-Based Modeling and Spatially Immersive Displays", Computer Graphics Proceedings, Annual Conference Series, 1998.
Majumder, et al., "Color Nonuniformity in Projection-Based Displays: Analysis and Solutions", IEEE Transactions on Visualization and Computer Graphics, vol. XX, No. Y, Month 2003.
Majumder, Aditi, "Perceptual Photometric Seamlessness in Projection-Based Tiled Displays", ACM Transactions on Graphics, vol. 2, No. 3, Sep. 2001.
Majumder, et al., Using a Camera to Capture and Correct Spatial Photometric Variation in Multi-Projector Displays, Department of Computer Science, University of California, Irvine.
Majumder, et al., "LAM: Luminance Attenuation Map for Photometric Uniformity in Projection Based Displays", Department of Computer Science, University of North Carolina at Chapel Hill.
Majumder, Aditi, "Camera Based Evaluation of Photometric Compensation Methods on Multi-Projector Displays", Department of Computer Science, University of California, Irvine.
Majumder, et al., "Achieving Color Uniformity Across Multi-Projector Displays", Department of Computer Science, University of North Carolina at Chapel Hill.
Li, et al., "Building and Using A Scalable Display Wall System", IEEE Computer Graphics and Applications.
Cotting, et al., "Adaptive Instant Displays: Continuously Calibrated Projections Using Per-Pixel Light Control", Eurographics 2005, vol. 24 (2005), No. 3.
Cotting, et al., "Embedding Imperceptible Patterns into Projected Images for Simultaneous Acquisition and Display", Proceedings of the Third IEEE and ACM International Symposium on Mixed and Augmented Reality (ISMAR 2004).
Hereld, et al., "Introduction to Building Projection-based Tiled Display Systems", IEEE Computer Graphics and Applications, Jul./Aug. 2000.
Brown, et al., "Camera-Based Calibration Techniques for Seamless Multi-Projector Displays", IEEE Transactions on Visualization and Computer Graphics, vol. X, No. X, Month Year.
Raskar, et al., "Shader Lamps: Animating Real Objects With Image-Based Illumination", University of North Carolina at Chapel Hill.
Bandyopadhyay, et al., "Dynamic Shader Lamps: Painting on Movable Objects", University of North Carolina at Chapel Hill.
Raskar, Ramesh, "Table-Top Spatially-Augmented Reality: Bringing Physical Models to Life with Projected Imagery", University of North Carolina at Chapel Hill, http://www.cs.uno.edu/raskar/Tabletop/.

(56) References Cited

OTHER PUBLICATIONS

R. Raskar, M. Brown, R. Yang, W. Chen, H. Towles, B. Seales, H. Fuchs, "Multi-projector Displays Using Camera Based Registrations", IEEE Visualization, 1999.
R. Raskar, J. V. Baar, T. Willwacher, S. Rao, "Quadric Transfer for Immersive Curved Screen Display", Eurographics, 2004.
H. Chen, R. Sukthankar, G. Wallace, K. Li, "Scalable Alignment of Large Format Multi-Projector Displays Using Camera Homography Tree", IEEE Visualization 2002.
G. Wallace, H. Chen, K. Li, Color Gamut Matching for tiled display walls, Immersive Projection Technology Workshop, 2003.
N. Bordes, B. Pailthorpe, W.P. Bleha, "Compact Tiled Display With Uniform Illumination," Journal of Electronic Imaging 12(4), 682-688, Oct. 2003.
M. C. Stone, "Color brightness and appearance issues in tiled displays", IEEE Computer Graphics and Applications, 2001.
Behzad Sajadi and Aditi Majumder, Scalable multi-view registration for multi-projector displays on vertically extruded surfaces, Jun. 2010, In Proceedings of the 12th Eurographics / IEEE—VGTC conference on Visualization (EuroVis' 10), 1063-1072.*

* cited by examiner

AUGMENTED REALITY USING PROJECTOR-CAMERA ENABLED DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims benefit under 35 U.S.C. §119(e) of U.S. Provisional Application having No. 61/538,414 filed Sep. 23, 2011, which is hereby incorporated by reference herein in its entirety.

STATEMENT OF GOVERNMENT INTEREST

The invention described herein was made in the performance of official duties by one or more employees of the University of California University system, and the invention herein may be manufactured, practiced, used, and/or licensed by or for the government of the State of California without the payment of any royalties thereon or therefor. The funding source or government grant number associated with inventions described herein is NSF-IIS-0846144.

BACKGROUND

The embodiments of the present invention relate to image projection and more specifically, to an augmented reality using projector-camera enabled devices.

Lighting real three dimensional objects (for example, a rock wall that has texture and is generally uneven) to create a compelling augmented reality experience is becoming popular for several applications like cultural heritage restoration, architectural lighting, geospatial analysis, scientific visualization, and theatrical lighting. A compelling experience may depend on the efficiency of augmenting the real three dimensional surface with high-resolution, vibrant and dynamic imagery. There may be a challenge in re-creating a scene or an image on uneven surfaces. Elements of the scene may suffer from distortion as the image source does not compensate for the variations in the surface.

Accordingly there is a need for a system that may provide an augmented reality while compensating for non-uniform surfaces.

SUMMARY

According to one aspect of the present invention, a system, comprises a projector; a camera coupled to the projector, the camera being disposed to capture an image projected onto an arbitrary surface by the projector; and a processing computing device coupled to the camera configured to: recognize the underlying surface geometry of the arbitrary surface by analyzing data in the image captured by the camera and an adjacent camera, register a scene within a three dimensional coordinate system for display on the arbitrary surface, and control the projector to display the registered scene undistorted onto the arbitrary surface.

According to another aspect of the invention, a method comprises capturing a set of images on an arbitrary surface while patterns are being projected on the arbitrary surface; recognizing a surface geometry of the arbitrary surface; and registering a scene corresponding to the surface geometry of the arbitrary surface.

According to a further aspect of the invention, a computer readable storage medium includes a computer readable code, when executed by a processing computing device, configured to: capture an image of an arbitrary surface; analyze a surface geometry from the image of the arbitrary surface for surface height variations; and register a scene corresponding to the surface height variations of the arbitrary surface.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As will be appreciated by one skilled in the art, aspects of the present invention may be embodied as a computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

The computer readable medium may be a computer readable storage medium. A computer readable storage medium may be, for example, a non-transitory or a tangible medium. Computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. A computer readable storage medium may be, for example, an electronic, magnetic, optical, electromagnetic, infrared, or semiconductor system or device.

Computer program instructions may also be loaded onto a computer, a processing computing device, a memory, or other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Broadly, embodiments of the subject technology may provide an augmented reality on arbitrary surfaces. Embodiments may automatically register multiple projector-camera enabled devices in a fully distributed manner on non-planar surfaces. The term "registration" will be understood to refer to image registration, for example, by transforming sets of data into a coordinate system.

Figure 1:
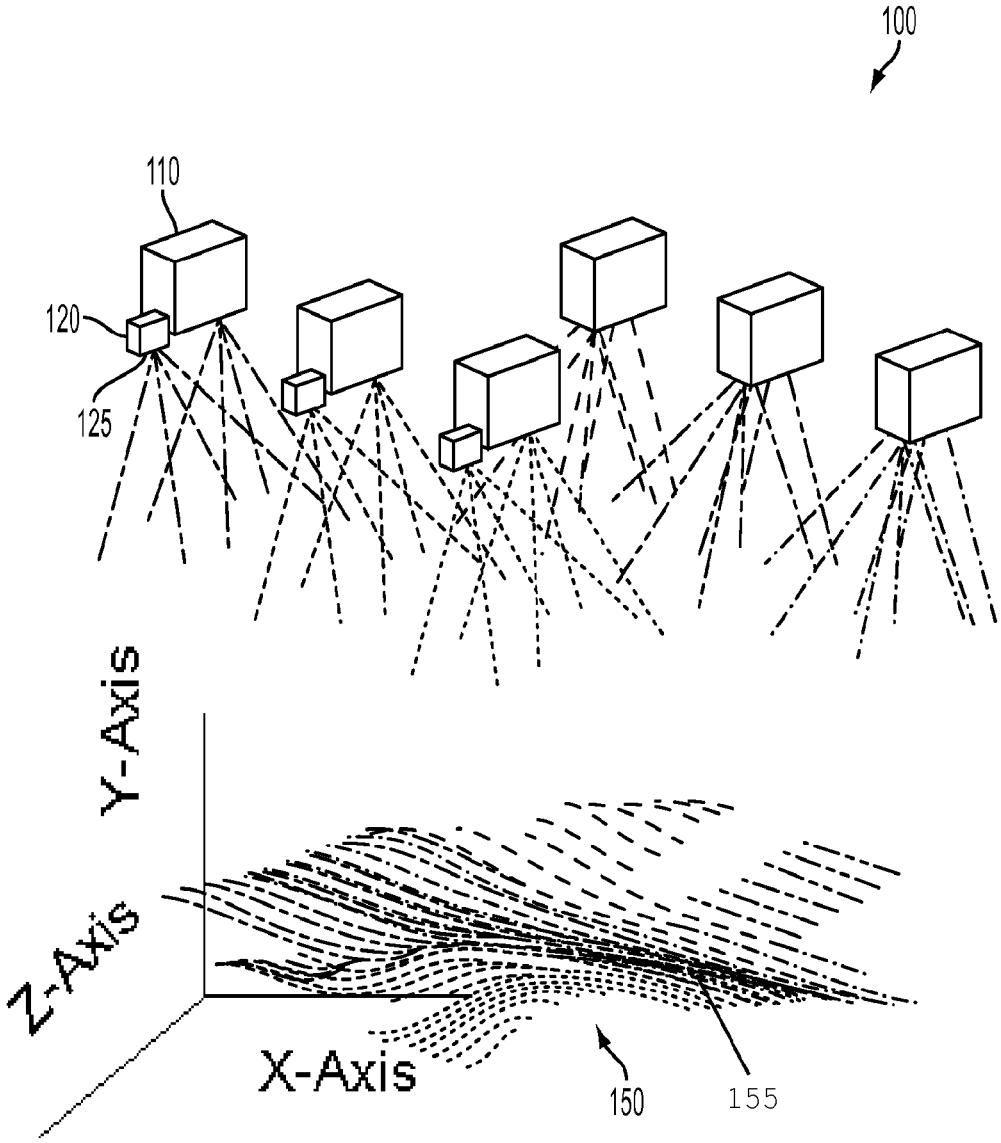
FIG. 1 is a perspective view of an augmented reality registration system in accordance with an exemplary embodiment of the present invention.
Figure 1A:
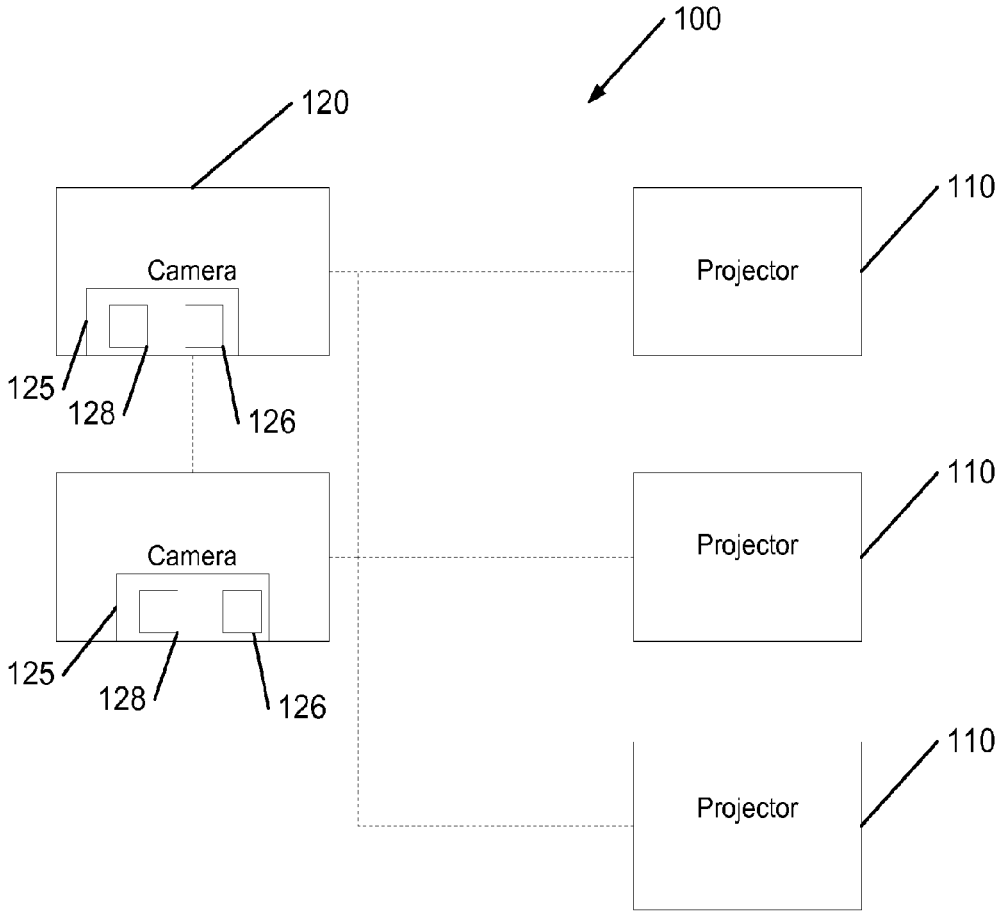
FIG. 1A is a block diagram of the system of FIG. 1.

Referring to FIGS. 1 and 1A, a system 100 is shown according to an exemplary embodiment if the present invention. The system 100 may include at least one projector 110 and at least one camera 120. In some embodiments, the system 100 may include a plurality of cameras 120 coupled to the projector 110. A processing computing device 125 that includes a processor 126 and a memory 128 (also referred to as a non-tangible computer readable media) may be coupled to the camera 120.

In some embodiments, the camera 120 may have a one to one correspondence with the projector 110. In some embodiments, the projector 110 and camera 120 may be coupled together into a physical unit. In some embodiments, the camera 120 may be separate from the projector 110. In some embodiments, the camera 120 may correspond to multiple projectors 110. For example, as shown in FIG. 1A, a camera 120 may be coupled to one or more projectors 110 either by hardwiring or wirelessly. The processing computing device 125 in each camera 120 may thus also control one or more projectors 110 in the system 100. In an exemplary embodiment, a plurality of projectors 110 and cameras 120 may be configured to provide an augmented reality scene 155 on an arbitrary surface 150. The arbitrary surface 150 may be represented as three dimensional coordinates in images captured by the camera(s) 120. The three dimensional coordinates of the arbitrary surface 150 may be stored as a file in the memory 128. The arbitrary surface 150 may be, for example, non-planar, uneven, irregular, or rough. The projectors 110 may be disposed in a non-uniform distribution, for example, in a non-grid formation when pointed at the arbitrary surface 150. The projectors 110 may be disposed to point at and project images onto the arbitrary surface 150. The cameras 120 may be disposed to capture an image(s) of the arbitrary surface 150 and images projected onto the arbitrary surface 150. In some embodiments, the projector 110 may be uncalibrated prior to projecting an image. Thus, no prior knowledge of the arbitrary surface 150 may be necessary when using the system 100. In some embodiments, the camera 120 may be uncalibrated when first acquiring an image of the arbitrary surface 150. Thus it may be appreciated that projectors 110 and cameras 120 may be pointed at any arbitrary surface 150 without any pre-stored data on the arbitrary surface 150 and a stored scene 155 may be registered to the underlying geometry when projected onto the arbitrary surface 150 without distortion in a facilitated point and shoot manner.

The processing computing device 125 may be configured to manage the camera's functionality. The camera 120 may be configured to communicate wirelessly. For example, the camera 120 may include an IP address that can be referenced within a network. The processing computing device 125 may also be configured to relay data among cameras 120 in the system 100 so that adjacent cameras 120 may communicate (either wirelessly or by hardwired fashion) with one another.

In some embodiments, the processing computing device 125 may be configured to analyze data from the camera 110 and control the projector 120 according to the analyzed data. The processing computing device 125 may be configured to analyze information from an image captured by the camera 120 to recognize the underlying surface geometry of the arbitrary surface 150. The processing computing device 125 may be configured to analyze the information related to the underlying surface geometry of the arbitrary surface 150, for example, for surface height variations. The processing computing device 125 may register the scene 155 from projectors 110 onto the arbitrary surface 150 in a three dimensional coordinate system so that projection of the image accounts for surface variations according to the three dimensional coordinate system and may be projected undistorted. Registering may include, for example, associating points in the scene 155 to corresponding three dimensional coordinates along the surface geometry of the arbitrary surface 150 so that the image appears as an undistorted three dimensional scene 155. For example, when the underlying surface geometry of the arbitrary surface 150 (for example, a rocky wall) is analyzed, the projectors 110 may project onto the rocky wall, a scene of a waterfall cascading down over the arbitrary surface 150 so that the underlying surface is indiscernible from the water flow.

In an exemplary embodiment, the camera 120 may be disposed to capture an image of the arbitrary surface 150. In some embodiments, the camera 120 may be disposed so that its field of view captures only a portion of the arbitrary surface 150. In some embodiments, two or more cameras 120 may be disposed to capture overlapping portions of the arbitrary surface 150. The projector 110 may be configured to project an image registered to the arbitrary surface 150 that may be a portion of the overall scene 155. The camera 120 may be configured to operate at a field of view that may be larger than the image projected by the projector 120. In embodiments using a plurality of projectors 110 and cameras 120, each camera 120 may be disposed to capture the image of the projector 110 corresponding to said camera 120, as well as some portion of an image projected by a projector 110 adjacent to the corresponding projector 110. Each camera 120 may be configured to analyze a portion of the arbitrary surface 150 where there may be some overlap between adjacent portions captured within the field of view of each camera 120.

Figure 2:
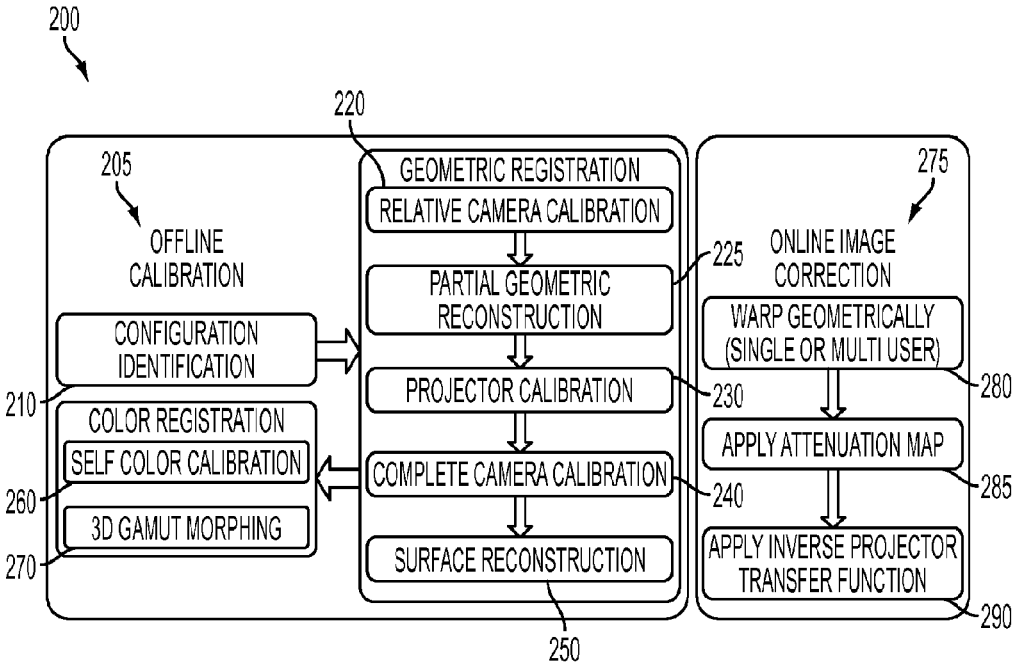
FIG. 2 is a flowchart of a method of registering an image on an arbitrary surface in accordance with still yet another exemplary embodiment of the present invention.
Figure 3:
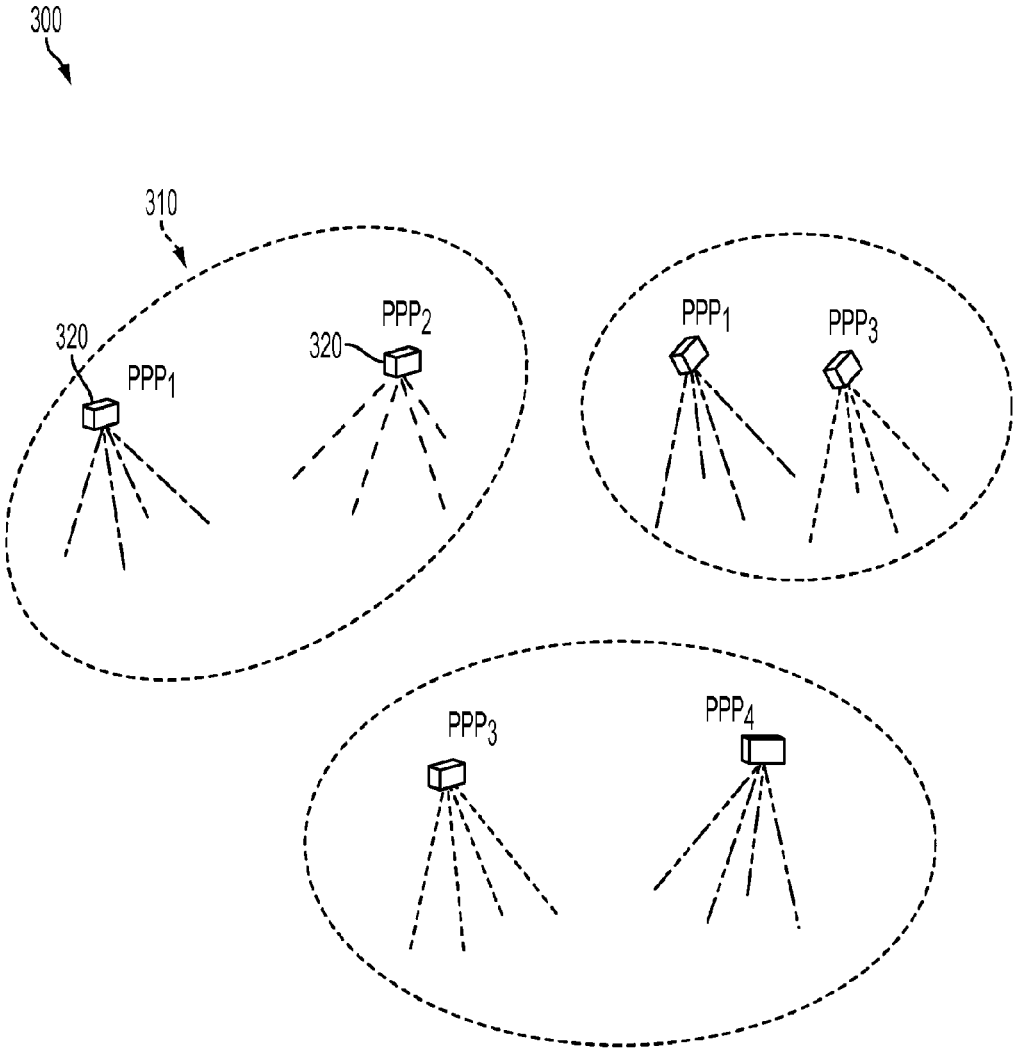
FIG. 3 is a diagrammatic view of projector-camera units used in the system of FIG. 1.
Figure 4:
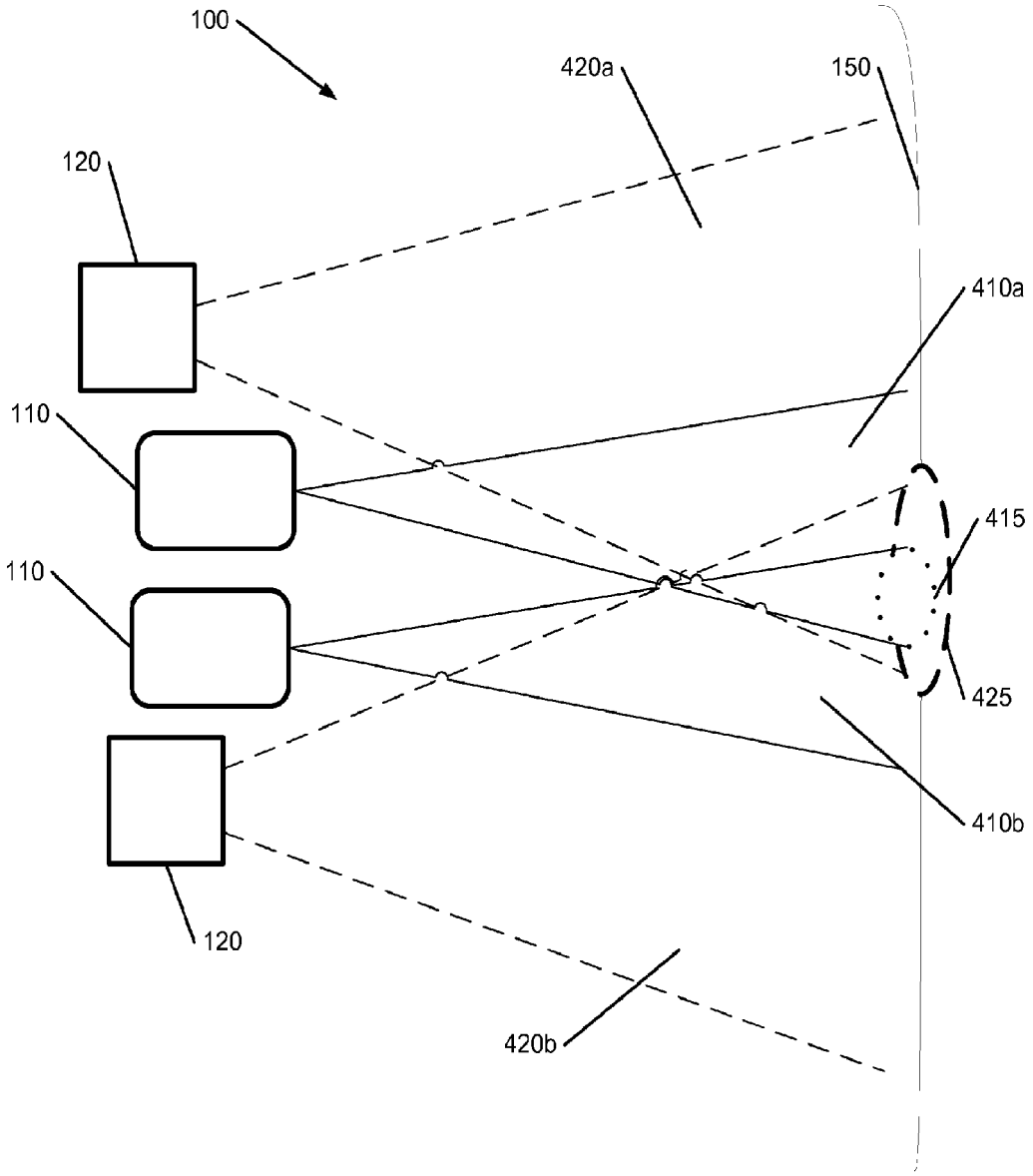
FIG. 4 is a side view of the system of FIG. 1 showing overlapping fields of view for projectors and cameras in the system.

Referring now to FIGS. 2-4, a method 200 (FIG. 2) of providing relief lighting on an arbitrary surface in a system 300 by groups 310 of camera-projector units 320 (FIG. 3) (labeled as "PPP") is shown according to an exemplary embodiment of the present invention. FIG. 4 shows exemplary image projection and capture by projectors 110 and cameras 120 in the system 100. Each projector 110 may project onto the arbitrary surface 150 within a projector field of view 410 (shown as fields of view 410a and 410b for adjacent projectors 110). Each camera 120 may capture an image of the arbitrary surface 150 within camera field of view 420 (shown as fields of view 420a and 420b for adjacent cameras 110). The camera-projector units 320 may comprise the camera 110 associated with the projector 120. The camera-projector units 320 may use plug and play type technology so that the projector 110 may be interchangeably coupled with any other camera 120. The method 200 may comprise a section 205 of offline calibration and a section 275 of online image correction.

In an exemplary embodiment, N projectors to N cameras used in the camera-projector units 320. Every part of the arbitrary surface may be covered by at least one projector and one camera while the number of total projectors and total cameras may be different. The coverage area of each camera may overlap with the coverage area of at least one other camera. The area covered by the projectors and the cameras may form a contiguous region. In an exemplary embodiment, the cameras should be selected to have minimal non-linear lens distortion or the lens distortion may be computed before determining camera calibration. For example, a fisheye lens may be used. Additionally, the projectors used should have minimal non-linear lens distortion or their lenses' distortion may be computed before camera calibration.

The processing computing device 125 may perform configuration identification of projectors 110 in the system 100 in step 210. Configuration identification may include recovering connectivity data among the camera-projector units 320 in the context of overlap in their display space or sensing space. For example, adjacent projectors 110 may each project an image that partially overlaps within a projector overlap region 415 (shown as the [dashed] *dotted* line ellipse) on the arbitrary surface 150. Adjacent cameras 120 may capture respective images that partially overlap within a camera overlap region 425 (shown as the [dotted] *dashed* line ellipse) on the arbitrary surface 150. The processing computing device 125 may detect the IP address associated with adjacent cameras 120 and may determine the location of the adjacent cameras 120. The processing computing device 125 may determine the projector 110 corresponding to adjacent cameras 120.

In an exemplary embodiment, defining the configuration of the projectors 110 and cameras 120 may involve using two undirected graphs: a camera adjacency graph, $A_c$, and a projector adjacency graph, $A_p$. An edge in $A_c$, i.e. $A_c(i; j)=1$, may denote sufficient overlap in the field of view (FOV) of cameras 120 represented as cameras Ci and Cj (for example, those cameras belonging to the pairs of camera-projector units 320 within the group 310) to allow the use of structure from motion (SfM) techniques to recover their relative positions. Formally, $A_c(i; j)=1$ if the FOV of camera Ci covers more that $\alpha$; $0<\alpha<1$ fraction of the FOV of Cj and vice versa, a may be set to $\alpha=0.2$. An edge in $A_p$, i.e. $A_p(i; j)=1$, may denote an overlap in the FOV of Pi and Pj (where Pi and Pj represent two adjacent projectors 110). Ap(i; j) may be set to =1 when Ci or Cj observes an overlap in the FOV of Pi and Pj. To recover $A_1$ and $A_p$, the processing computing device 125 may calibrate according to the order of the IP addresses of the camera-projector units 320. A token may be passed around to all the camera-projector units based on a sorted list of IP addresses. When a camera-projector unit i has the token, Pi may display white while any other camera-projector units j, $i\neq j$, may display black. Further, all cameras Cj, $i\neq j$, may capture a picture. This may allow a camera-projector unit j to find its local adjacency in $A_c$ and $A_p$. Once the token is passed among the camera-projector units, each camera 120 may broadcast its local adjacency information to all other camera-projector units. The results may be stored and aggregated on each camera-projector unit 320 to create complete graphs in each of them. However, this graph may be directed. To achieve a consistent undirected graph across all camera-projector units 320, each camera-projector unit 320 may set $A_c(i; j)=A_c(i; j)VA_c(j; i)$ and $A_p(i; j)=A_p(i; j)VA_p(j; i)$, $\forall(i; j)$. Further, $A_c(i; i)=0$ and $A_p(i; i)=1$.

The processing computing device 125 may provide geometric registration of the underlying geometry of the arbitrary surface 150. Geometric registration may include a step 220 of relative camera calibration. Geometric registration may recover the parameters (intrinsic and extrinsic) of each camera Ci with respect to all its adjacent cameras. For each pair of camera-projector units i and j such that $A_c(i; j)=1$, the set of correspondences between cameras 120 may be recovered and then used to recover the relative camera calibration parameters.

To recover the correspondences between cameras Ci and Cj, binary structured light patterns (SLP) from Pi and Pj may be used. Each of these patterns may be seen by both cameras Ci and Cj allowing the recovery of the correspondences between Ci and Cj as follows. First camera-projector unit j may process the images captured by camera Cj of SLP projected by projector Pi to find the correspondences Pi→Cj. This may then be inverted via interpolation to find the correspondences Cj→Pi. Similarly, camera-projection unit i may process the images captured by Ci of the same SLP projected by Pi to find correspondences Pi→Ci. The correspondences between the two cameras, Cj→Ci may be recovered by first using Cj→Pi followed by using Pi→Ci. Similarly, the SLP projected by Pj may be used to find more correspondences. Thus, cameras Ci and Cj may communicate correspondences with each other creating a larger set of correspondences.

The priority assigned by the sorted IP addresses may be used in communicating information among the camera-projection units 320. The camera-projection unit 320 with the highest priority may put up its SLP broadcasting it to all other camera-projector units 320 initiating a capture in all the adjacent camera-projector units 320. The removal of SLP may also be communicated to all camera-projector units 320 via a broadcast message. Every camera-projector unit 320 may wait for all higher priority adjacent camera-projector units 320 to complete before it starts its SLP. This scheme may allow non-overlapping camera-projector units 320 to put up their SLP for capture simultaneously making the process time-efficient, especially when considering a large number of camera-projector units 320.

Once a camera-projector unit i has recovered its correspondences with its neighbor camera-projector unit j, it may use an iteratively weighted least square method to find the fundamental matrix between Ci and Cj, denoted by Fij. Assuming the same focal length, camera-projector unit i may then perform a self-calibration routine to recover its camera focal length. Using this information, each camera-projector unit i may estimate a robustness factor rij for the estimated focal length with its neighbor camera-projector unit j. The estimated focal length and rij may be broadcast to all camera-projector units 320. On receiving this information from other camera-projector units 320, camera-projector unit i may compute a weighted average of all the focal lengths weighted by a robustness factor, rij. This may allow convergence to a consistent and robust estimate of f across all camera-projector units 320. With a known Fijs and K (where F may represent a fundamental matrix between camera views i and j and K may represent an intrinsic camera matrix), each camera-projector unit i may compute its essential matrix with respect to an adjacent camera-projector unit j, using the quantity $K^TFijK$. The corresponding points between cameras Ci and Cj and the essential matrix may be used to recover the relative rotation Rij and translation Tij of the camera pairs, up to a scale factor. The recovered relative pose of camera Ci with respect to camera Cj may be denoted by |Rij|Tij|, where Rij is a 3×3 rotation matrix and Tij is a 3×1 translation vector.

In step 225, the processing computing device 125 may perform a partial geometric reconstruction of the underlying geometry of the arbitrary surface for all the points that are observed by a pair of cameras that are calibrated in the step relative camera calibration. For each calibrated pair of cameras, the processing computing device 125 may run stereo reconstruction to determine the three dimensional location of the data points that are observed by both of the cameras. The set of points determined from the different camera pairs may have different scale factors.

In step 230, the processing computing device 125 may perform a relative projector calibration. A calibration matrix may be computed for each projector 110 with respect to one of the cameras 120. For each projector, all the projector pixels that are covered by at least one camera pair may be reconstructed from the set of data points determined in the step of partial geometric reconstruction. These reconstructed data points may have different scale factors if observed by different camera pairs. The processing computing device 125 may apply a non-linear optimization to the reconstructed data points to recover the calibration matrix of the projector with respect to an arbitrary camera from one of these camera pairs. During this process the processing computing device 125 may also recover a ratio of the scale factors for different camera pairs that observe the same projector.

In step 240, the processing computing device 125 may perform a complete camera calibration. In this step, the processing computing device 125 may compute the parameters of all the projectors 110 and cameras 120 relative to one of the cameras. For example, one of the cameras may be designated as a reference camera. The processing computing device 125 may use the computed relative camera calibration for camera-projector units 320 calculated in step 220 to compute the parameters. The processing computing device 125 may use the relative projector calibration and scale factors computed in step 230.

A linear optimization may be applied to values representing the relative camera calibration, the relative projector calibration, and the scale factors to determine a calibration matrix for the camera-projector units 320 with respect to the reference camera while satisfying all the relative calibration parameters. Each camera-projector unit 320 may find the position and orientation of its camera Ci with respect to a global coordinate system. This may be denoted with a 3×4 matrix, Ei=|Ri|Ti|. To recover Ei for all an N number of camera-projector units 320, leading to 12N unknowns. This can be expressed as Ei in terms of the already computed relative calibration parameter with neighbor Cj as $$Ei=(R_{ji}|s_{ji}T_{ji})(R_j|T_j) \quad (1)$$

$$(000|1)=|R_{ji}R_{ij}s_{ji}T_{ji}+R_{ji}T_j|$$

where $s_{ji}$ is an unknown scale factor. Using this, for every adjacent pair of camera-projector units 320, 12 linear equations may be obtained at the expense of adding 1 unknown, the scale factor. All camera-projector units 320 may consider a selected camera-projector unit 320 as a reference point by assuming $E_1$=I. Further to reach a common scale factor, all the camera-projector units 320 may consider the scale factor of the pair of adjacent projectors with highest priority, p and q, as the reference scale. Hence, $s_{pq}$=1. These references may reduce the total number of unknowns to 12(N−1)+M−1. Assuming M pairs, the total number of equations may be 12M equations. Since M may be usually larger than N, an over-constrained linear system may be achieved which can be solved by standard linear least squares techniques. To achieve this in system 100, all camera-projector units 320 may broadcast their recovered rotation matrix $R_{ij}$ and translation vector $T_{ij}$. Using the rotation matrix $R_{ij}$ and translation vector $T_{ij}$ recovered, each camera-projector unit 320 may run a linear least squares to find its Ei.

In step 250, the processing computing device 125 may perform a complete geometric surface reconstruction of the underlying geometry of the arbitrary surface. For each camera-projector unit i, its projector and camera may already be calibrated with respect to the global coordinate system, as determined per the previous steps in the method 200. The projector and camera within each camera-projector unit 320 may form a stereo pair looking at the surface geometry Si that falls in the FOV of projector Pi. The set of correspondences between the projector-camera pair, Ci→Pi, may be used along with the complete camera calibration and the projector calibration to perform a three dimensional stereo reconstruction of points to recover the surface geometry Si with respect to the global coordinate system. All the cameras Cj and projectors Pj whose field of view or image projection overlap with projector Pi may be considered. This may assure that the surface in the overlap region of multiple camera-projector units 320 may be reconstructed identically. The surface geometry of arbitrary surface 150 may thus be reconstructed.

The geometric registration portion of method 200 may be adjusted for N projectors and M cameras. For example, every part of the arbitrary surface may be covered by at least one projector and two cameras while the number of projectors and cameras in the system may be different. The area covered by the projectors and the cameras may form a contiguous region. The cameras used may be pre-calibrated for lens distortion being used in camera calibration. In an exemplary embodiment, the camera lens may be selected with the least amount of non-linear distortion available. For example, a lens with non-linear distortion that may be used may include a fisheye lens. Since each part of the arbitrary surface is covered by more than one camera, steps 220, 225, and 250 may be employed and steps 230 and 240 may not necessarily be performed to recover the complete geometry of the surface which can be then used to seamlessly register the projectors.

In step 260, self color calibration may be performed. Self color calibration may recover a common camera transfer function, t and the projector color parameters $t^p$, W, and B for each camera-projector unit i. The projector-camera self-calibration may be performed as follows. All camera-projector units 320 may project white images, synchronized via broadcast communications. Each camera Ci may capture this white image at multiple exposures to estimate the camera transfer function. The transfer function recovered by each camera Ci may then be broadcast to all the camera-projector units 320 which may then be averaged by each camera-projector unit 320 to find the common transfer function, t. For each camera-projector unit i of non-overlapping areas, projector Pi may project different intensities of white and the corresponding camera Ci may capture an image with the highest exposure that does not result in saturated areas. The captured images may be linearized using the function t. This image may be converted to XYZ space using an sRGB to XYZ conversion to extract the total tri-stimulus value (which provides an estimate of the total brightness) at each camera pixel given by the addition of the XYZ channels. This value may be averaged across all the camera pixels that fall in the non-overlapping region. This may provide a set of correspondences between the intensity projected by a projector and that captured by a linear camera. These values may be normalized which may provide an estimate of the projector transfer function $t^p_i$.

For each camera-projector unit i, the maximum brightness in red, green and blue from Pi may be projected which may be captured by camera Ci. These images may be linearized using the previously recovered function t and then converted to the XYZ space using a 3×3 matrix for an sRGB to XYZ conversion. Thus XYZ values corresponding to the red, green and blue channels at each pixel of the captured image may form the three rows of a matrix that provides the two dimensional gamut Wi at that pixel. These values may be averaged across all the pixels to find the two dimensional gamut Wi of projector Pi.

Each camera-projector unit i may use camera Ci to recover the maximum brightness profile of its own projector Pi, denoted by Bi. For this, the same red, green and blue images projected by projector Pi may be used and captured by camera Ci while recovering the two dimensional gamut Wi. The color of the captured images may be linearized and converted to XYZ space as described previously. At every pixel, the total tri-stimulus value (X+Y+Z) may be found, which may provide an estimate of the maximum brightness at that pixel. Finding this across all the pixels in the captured image may provide Bi in the coordinate system of camera Ci. The set of correspondences Ci→Pi may be used to warp Bi to the coordinate space of projector Pi.

Gamut smoothing may be achieved in an iterative distributed algorithm in two steps: two dimensional gamut smoothing followed by brightness smoothing. In each iteration in each of these steps, there may be a set of camera-projector units 320, R, that have completed the smoothing operation and hence form a registered subregion of the display. In the first iteration, R may be a singleton set consisting of the camera-projector unit 320 with the highest priority. The highest priority projector may be designated as $P_1$, in the first iteration R={P1} In each of the subsequent iterations, a $P_i \epsilon R^c$ with highest priority that is adjacent to at least one element of R completes the smoothing algorithm. Thus, one camera-projector unit 320 gets added to R in each iteration increasing the registered subregion of the display. The process may stop when all the N number of camera-projector unit 320 are included in R and hence the whole display is registered.

In step 280, the online image correction on the surface may be performed such that overlapping pixels from different projectors may display the same content in a seamless manner. To generate the image Ii to be projected by projector Pi, the geometric registration may be performed in two different ways: view-dependent geometric registration for single-user applications; and view-independent geometric registration for multiuser applications.

In multiuser applications the image Ii may be wallpapered on the arbitrary surface 150. For every location (X;Y;Z) on the arbitrary surface 150, color may be determined based on the specific characteristics of that location. A simple example may include indicating the height of the points in a relief map using different colors. In this case the color may be decided solely based on the Y coordinate of the pixels. Another example may include pasting different map layers over the arbitrary surface 150, e.g. satellite imagery, a road map, or a traffic map.

To achieve a view dependent registration for single user applications, the virtual camera (or viewpoint) with projection matrix V may be defined. This can be different from the viewpoint of any of the calibrating cameras. A two-pass rendering approach maybe employed. The three dimensional scene may be rendered from this virtual camera using projection matrix V. To generate the image Ii for each projector, at any pixel (x;y) the corresponding three dimensional coordinates of the surface geometry $S_i(x;y)$ may be found. The three dimensional coordinate may be found using the projection matrix V to find the corresponding pixel from the image rendered in the first pass. The color at this pixel maybe used to generate the image Ii.

In step 285, the image Ii may be attenuated using $\alpha^r_i$, $\alpha^g_i$, and $\alpha^b_i$, which may represent attenuation maps for R (red), G (green), and B (blue) channels. In step 290, the image Ii may be linearized using the projector transfer function $t^p_i$ to achieve the color registration.

It should be understood, of course, that the foregoing relates to exemplary embodiments of the invention and that modifications may be made without departing from the spirit and scope of the invention as set forth in the following claims.

What is claimed is:

1. A system for projecting an image of a scene onto an arbitrary surface that is non-planar in both horizontal and vertical directions, the system comprising:

a first [un-calibrated] camera [coupled to] *un-calibrated in relative camera calibration parameters:* a first projector, the first [un-calibrated] camera being disposed to capture at least *a part of at least* a first portion of the image projected onto the arbitrary surface by the first projector, wherein the first portion of the image includes a first point;

[an adjacent un-calibrated] *a second* camera [coupled to] *un-calibrated in relative camera calibration parameters;* a second projector, wherein the [adjacent un-calibrated] *second* camera is disposed to capture at least *a part of at least* a second portion of the image projected onto the arbitrary surface by the second projector, wherein the second portion of the image includes the first point;

*wherein the first camera and the second camera are interchangeably coupled and uncoupled from the first projector and the second projector such that any camera can be coupled to any projector;* and

[a] *one or more* processing computing [device coupled to the first camera configured to] *coupled to a non-transitory computer readably storage medium that includes computer readable code that, when executed by the one or more processing computing devices, causes the one or more processing computing devices to*:

*perform configuration identification of the projectors and cameras based on an adjacency graph representation in context of overlap in their display space or sensing space,*

[recognize] *reconstruct* an underlying surface geometry of the arbitrary surface by analyzing data in the at least *the part of at least the* first portion of the image captured by the first camera [and], the at least *the part of at least the* second portion of the image captured by the [adjacent] *second* camera, *or a combination thereof,* register an overlapping portion of the image of the scene, that is projected by the first projector and projected by the second projector, within a [three dimensional] coordinate system for display on the arbitrary surface *based on an analysis of the data in the at least the part of at least the first portion of the image captured by the first camera, the at least the*

*part of at least the second portion of the image captured by the second camera, or a combination thereof*, and control the at least one of the first projector and the second projector to display [the overlapping portion of the image of] the registered scene onto the arbitrary surface [based on an analysis of the data in the at least first portion of the image captured by the first camera and the at least second portion of the image captured by the adjacent camera].

[2. The system of claim 1, wherein the arbitrary surface is non-planar.]

3. The system of claim 1, wherein the *first or the second* camera is uncalibrated prior to capturing the image.

4. The system of claim [3] *1*, wherein the *first or the second* projector is uncalibrated prior to projecting the image.

5. The system of claim 1, wherein the *first or the second* camera captures a field of view larger than a field of view of the *first or the second* projector *respectively*.

6. The system of claim 1, wherein the *first* camera is disposed to capture a portion of an image associated with [an adjacent] *the second* projector.

7. The system of claim 1, wherein the *first or the second* camera is configured to wirelessly communicate with [adjacent] *other* cameras or projectors.

8. The system of claim 1, wherein the system comprises [a plurality of] *more than two* projectors[coupled to the camera].

9. The system of claim [8] *1*, wherein the system comprises [a plurality of] *more than two* cameras[coupled to the plurality of projectors].

10. A method for projecting an image of a scene onto an arbitrary surface that is non-planar in both horizontal and vertical directions, the method comprising:

*performing configuration identification of projectors and cameras based on an adjacency graph representation in context of overlap in their display space or sensing space, wherein the cameras are interchangeably coupled and uncoupled from the at least two projectors such that any camera can be coupled to any projector;* capturing, from at least one [un-calibrated] camera *un-calibrated in relative camera calibration parameters*, a set of images of the arbitrary surface while patterns are projected on the arbitrary surface by *at least one of* at least two projectors, [wherein the arbitrary surface is horizontally and vertically irregular,] and wherein at least a first portion of a first image projected by a first projector of the at least two projectors overlaps *on the arbitrary surface* with at least a second portion of a second image projected by a second projector of the at least two projectors;

[recognizing] *reconstructing* a surface geometry of the arbitrary surface, based on the patterns projected on the arbitrary surface, using *multiview* stereo reconstruction to determine three dimensional locations of data points within the set of images; and registering the first portion of the first image and the second portion of the second image to project the image of the scene [corresponding] *onto* the surface geometry of the arbitrary surface.

11. The method of claim 10, wherein the step of capturing includes using two [adjacent] cameras to capture the set of images.

12. The method of claim 11, comprising recovering correspondences between the two [adjacent] cameras using [binary] structured light patterns (SLP) from *at least one of* a plurality of projectors.

13. The method of claim 11, comprising: [analyzing the set of images captured by the two adjacent cameras; and] reconstructing the [recognized] surface geometry [into a three dimensional image] *of the arbitrary surface based on an analysis of the set of images captured by the two cameras*.

14. The method of claim 10, wherein the step of registration includes associating points in the scene to corresponding three dimensional coordinates along the surface geometry of the arbitrary surface.

15. The method of claim 10, comprising projecting a first image in the set of images to overlap an adjacent projected image in the set of images.

16. A non-transitory computer readable storage medium comprising:

a computer readable code, which when executed by a processing computing device, causes the processing computing device to:

*perform configuration identification of projectors and cameras based on an adjacency graph representation in context of overlap in their display space or sensing space, wherein a first camera and a second camera are interchangeably coupled and uncoupled from a first projector and a second projector such that any camera can be coupled to any projector;* capture [an image] *a scene* of an arbitrary surface that is non-planar in both horizontal and vertical directions, wherein at least one point within the captured [image] *scene* is:

(*i*) within a field of view of an [un-calibrated] *a* camera *un-calibrated in relative camera calibration parameters*, within a first image projected by a first projector and within a second image projected by a second projector, or (*ii*) within an image projected by a projector [and], within a first [field of view of] *image captured by* a first [un-calibrated] camera *un-calibrated in relative camera calibration parameters* and within a second [field of view of] *image captured by* a second [un-calibrated] camera *un-calibrated in relative camera calibration parameters*;

analyze a surface geometry of the arbitrary surface[,] from the [image] *scene* of the arbitrary surface[,] for surface height variations; and register *on the arbitrary surface* (*a*) a first portion of the first image, that is projected by the first projector, with a second portion of the second image, that is projected by the second projector, [corresponding to the surface height variations of the arbitrary surface] *or* (*b*) *register a first portion of the first image captured by the first camera with a second portion of the second image captured by the second camera* such that first height variations in the first portion of the first image and second height variations in the second portion of the second image are indiscernible from the surface height variations *of the arbitrary surface* on which the first portion and the second portion are [protected] *projected or captured*.

17. The non-transitory computer readable storage medium of claim 16, wherein the computer readable code when executed by a processing computing device, relays data among [adjacent] cameras capturing images of the arbitrary surface.

18. The non-transitory computer readable storage medium of claim 16, wherein the scene is registered *by associating points in the scene* to [correspond to a three dimensional coordinate system associated with] *corresponding three dimensional coordinates along the surface geometry of* the arbitrary surface.

19. The non-transitory computer readable storage medium of claim 16, wherein the computer readable code is configured, when executed by a processing computing device, to [reconstruct the captured image] *recover calibration matrices of the projectors* using a non-linear optimization on data points representing the [captured image] *arbitrary surface*.

20. The non-transitory computer readable storage medium of claim 16, wherein the computer readable code is configured, when executed by a processing computing device, to control a projector to display the scene as corresponding to three dimensional coordinates along the surface geometry of the arbitrary surface.

*21. The system of claim 1, wherein the first or the second camera is configured to wirelessly communicate with a computing device.*

*22. The system of claim 1, wherein the first or the second projector is configured to wirelessly communicate with a computing device.*

*23. The system of claim 1, wherein the computer readable code is configured, when executed by the one or more processing computing devices, to cause the one or more processing computing devices to associate points in the image to three dimensional coordinates along the surface geometry of the arbitrary surface.*

*24. The system of claim 1, wherein the first camera or the second camera comprises fisheye lens.*

*25. The system of claim 1, wherein the computer readable code is configured, when executed by the one or more processing computing devices, to cause the one or more processing computing devices to compute projector calibration parameters.*

*26. The system of claim 1, wherein:*

*i. at least one of the first camera, the second camera, the first projector, or the second projector is calibrated with respect to a global coordinate system; or*

*ii. the non-transitory computer readable storage medium includes computer readable code that, when executed by the one or more processing computing devices, causes the one or more processing computing devices to calibrate at least one of the first camera, the second camera, the first projector, or the second projector to a global coordinate system.*

*27. The system of claim 1, wherein the computer readable code further causes the one or more processing computer devices to:*

*register the first portion of the image of the scene, that is projected by the first projector, within the coordinate system for display on the arbitrary surface based on an analysis of the data in the at least the part of at least the first portion of the image captured by the first camera.*

*28. The system of claim 1, wherein the computer readable code further causes the one or more processing computer devices to:*

*register the second portion of the image of the scene, that is projected by the second projector, within the coordinate system for display on the arbitrary surface based on an analysis of the data in the at least the part of at least the second portion of the image captured by the second camera.*

*29. The method of claim 10, comprising recovering correspondences between the camera and the first projector or the second projector using structured light pattern (SLP) projected from the first projector or the second projector respectively.*

*30. The method of claim 10 further comprising computing projector calibration parameters.*

*31. The method of claim 10, wherein:*

*i. the at least one camera or at least one of the projectors is calibrated with respect to a global coordinate system; or*

*ii. the method further comprises calibrating the at least one camera or at least one of the projectors to a global coordinate system.*

*32. The method of claim 10 further comprising:*

*registering the first image of the scene to project the image of the scene corresponding to the surface geometry of the arbitrary surface.*

*33. The method of claim 10 further comprising:*

*registering the second image of the scene to project the image of the scene corresponding to the surface geometry of the arbitrary surface.*

*34. The non-transitory computer readable storage medium of claim 16, wherein:*

*i. at least one of the first camera, the second camera, or the projectors is calibrated with respect to a global coordinate system; or*

*ii. the computer readable code is configured, when executed by the one or more processing computing devices, to cause the one or more processing computing devices to calibrate at least one of the first camera, the second camera, or the projectors to a global coordinate system.*

*35. A projection system, comprising:*

*a first projector configured to project a first image of a scene onto an arbitrary surface that is non-planar in both horizontal and vertical directions;*

*a second projector configured to project a second image of the scene onto the arbitrary surface that is non-planar in both horizontal and vertical directions;*

*a first camera, un-calibrated in relative camera calibration parameters, said first camera configured to capture at least a part of the first image, wherein the part of the first image includes a first point;*

*a second camera, un-calibrated in relative camera calibration parameters, said second camera configured to capture at least a part of the second image, wherein the part of the second image includes the first point, wherein the first camera and the second camera are interchangeably coupled and uncoupled from the first projector and the second projector such that any camera can be coupled to any projector; and*

*one or more processing computing devices coupled to a non-transitory computer readable storage medium that includes computer readable code that, when executed by the one or more processing computing devices, causes the one or more processing computing devices to:*

*perform configuration identification of the projectors and cameras based on an adjacency graph representation in context of overlap in their display space or sensing space, and*

*perform geometric correction of the projected images such that the projected images are geometrically registered onto the arbitrary surface.*

*36. The projection system of claim 35, wherein the computer readable code is configured, when executed by the one*

*or more processing computing devices, to cause the one or more processing computing devices to perform geometric correction of the projected images by reconstructing an underlying surface geometry of the arbitrary surface based on an analysis of data in the first image captured by the first camera or the second image captured by the second camera.*

*37. The projection system of claim 35, wherein the computer readable code is configured, when executed by the one or more processing computing devices, to cause the one or more processing computing devices to control the first projector or the second projector such that overlapping portions of the first image and the second image are displayed seamlessly.*

*38. The projection system of claim 37, wherein the computer readable code is configured, when executed by the one or more processing computing devices, to cause the one or more processing computing devices to associate points in the image to three dimensional coordinates along the surface geometry of the arbitrary surface.*

*39. The projection system of claim 35, wherein the computer readable code is configured, when executed by the one or more processing computing devices, to cause the one or more processing computing devices to reconstruct an underlying surface geometry of the arbitrary surface by analyzing data in the first image captured by the first camera or at least the second image captured by the second camera.*

*40. The projection system of claim 39, wherein the computer readable code is configured, when executed by the one or more processing computing devices, to cause the one or more processing computing devices to associate points in the image to three dimensional coordinates along the surface geometry of the arbitrary surface.*

*41. The projection system of claim 35, wherein the computer readable code is configured, when executed by the one or more processing computing devices, to cause the one or more processing computing devices to associate points in the image to three dimensional coordinates along the surface geometry of the arbitrary surface.*

*42. The system of claim 35, further comprising a plurality of cameras including the first camera and the second camera, wherein said plurality of cameras is un-calibrated in relative camera calibration parameters, wherein the computer readable code is configured, when executed by the one or more processing computing devices, to cause the one or more processing computing devices to identify one or more cameras of the plurality of cameras that are adjacent to each other based on an analysis of images captured by plurality of cameras.*

*43. The system of claim 42, wherein the computer readable code is configured, when executed by the one or more processing computing devices, to cause the one or more processing computing devices to identify one or more projectors associated with the one or more cameras of the plurality of cameras that are adjacent to each other.*

*44. The system of claim 35, further comprising a plurality of projectors including the first projector and the second projector, wherein the computer readable code is configured, when executed by the one or more processing computing devices, to cause the one or more processing computing devices to identify one or more projectors of the plurality of projectors that are adjacent to each other based on an analysis of images projected by the plurality of projectors and captured by one or more cameras.*

*45. The projection system of claim 35, wherein:*

*i. at least one of the camera or the projector is calibrated with respect to a global coordinate system; or*

*ii. the computer readable code is configured, when executed by the one or more processing computing devices, to cause the one or more processing computing devices to calibrate at least one of the camera or the projector to a global coordinate system.*

*46. A system for projecting an image of a scene onto an arbitrary surface that is non-planar in both horizontal and vertical directions, the system comprising:*

*a first camera un-calibrated in relative camera calibration parameters, said first camera configured to capture at least a portion of a first image projected onto the arbitrary surface by a first projector, wherein the portion of the first image includes a first point;*

*a second camera un-calibrated in relative camera calibration parameters, said second camera configured to capture at least a portion of a second image projected onto the arbitrary surface by a second projector, wherein the first camera and the second camera are interchangeably coupled and uncoupled from the first projector and the second projector such that any camera can be coupled to any projector, wherein the portion of the second image includes the first point; and*

*one or more processing computing devices coupled to a non-transitory computer readable storage medium that includes computer readable code that, when executed by the one or more processing computing devices, causes the one or more processing computing devices to:*

*perform configuration identification of the projectors and cameras based on an adjacency graph representation in context of overlap in their display space or sensing space; and*

*control at least one of the first projector and the second projector such that an overlapping portion of the first and the second images projected by the first projector and the second projector respectively is geometrically registered onto the arbitrary surface,*

*wherein control of at least one of the first projector and the second projector is based on a reconstruction of an underlying surface geometry of the arbitrary surface from an analysis of the data in at least the portion of the first image captured by the first camera, at least the portion of the second image captured by the second camera, or a combination thereof and associating one or more points in the first and the second images to corresponding three dimensional coordinates along the surface geometry of the arbitrary surface.*

*47. The system of claim 46, wherein the first or the second camera is uncalibrated prior to capturing the portion of the first image or the portion of the second image.*

*48. The system of claim 46, wherein the first or the second projector is uncalibrated prior to projecting the first or the second image.*

*49. The system of claim 46, wherein the first or the second camera captures a field of view larger than a field of view of the first or the second projector respectively.*

*50. The system of claim 46, wherein the first camera is configured to capture a portion of the second image projected by the second projector or the second camera is configured to capture a portion of the first image projected by the first projector.*

*51. The system of claim 46, wherein the first or the second camera is configured to wirelessly communicate with other cameras or projectors.*

*52. The system of claim 46, wherein the system comprises a plurality of projectors coupled to the first or the second camera.*

*53. The system of claim 52, wherein the system comprises a plurality of cameras coupled to the plurality of projectors, wherein said plurality of cameras is un-calibrated in relative camera calibration parameters.*

*54. The system of claim 46, wherein:*

*i. at least one of the first camera, the second camera, the first projector, or the second projector is calibrated with respect to a global coordinate system; or*

*ii. the non-transitory computer readable storage medium includes computer readable code that, when executed by the one or more processing computing devices, causes the one or more processing computing devices to calibrate at least one of the first camera, the second camera, the first projector, or the second projector to a global coordinate system.*

* * * * *